(12) United States Patent
Anderegg

(10) Patent No.: US 9,533,694 B2
(45) Date of Patent: Jan. 3, 2017

(54) HEATING APPLIANCE FOR RAILWAY VEHICLES

(75) Inventor: Kurt Anderegg, Rheineck (CH)

(73) Assignee: 3A Technology & Management Ltd. (CH)

( * ) Notice: Subject to any disclaimer, the term of this patent is extended or adjusted under 35 U.S.C. 154(b) by 978 days.

(21) Appl. No.: 13/321,720

(22) PCT Filed: May 11, 2010

(86) PCT No.: PCT/EP2010/002888
§ 371 (c)(1),
(2), (4) Date: Nov. 21, 2011

(87) PCT Pub. No.: WO2010/133308
PCT Pub. Date: Nov. 25, 2010

(65) Prior Publication Data
US 2012/0067862 A1    Mar. 22, 2012

(30) Foreign Application Priority Data
May 20, 2009    (DE) .................. 10 2009 022 091

(51) Int. Cl.
*B60L 1/02* (2006.01)
*B61D 27/00* (2006.01)
*B61D 17/10* (2006.01)
*F24D 13/02* (2006.01)

(52) U.S. Cl.
CPC ........... *B61D 27/0045* (2013.01); *B61D 17/10* (2013.01); *F24D 13/022* (2013.01); *Y02B 30/26* (2013.01)

(58) Field of Classification Search
CPC .... B61D 17/10; B61D 27/0045; F24D 13/022
USPC .. 219/202, 213, 217, 494, 635, 660; 428/76, 71, 166, 188; 156/173, 169, 172, 156/175
See application file for complete search history.

(56) References Cited

U.S. PATENT DOCUMENTS

| | | | |
|---|---|---|---|
| 2,382,340 A * | 8/1945 | Smith | 237/6 |
| 2,760,726 A * | 8/1956 | Parks et al. | 237/43 |
| 6,871,600 B2 | 3/2005 | Norton | |
| 7,897,235 B1 * | 3/2011 | Locher et al. | 428/76 |
| 2003/0146207 A1 * | 8/2003 | Reichle | 219/635 |
| 2007/0215589 A1 | 9/2007 | Berger | |

FOREIGN PATENT DOCUMENTS

| | | |
|---|---|---|
| DE | 9209999.8 | 8/1993 |
| DE | 19606792 A1 | 8/1997 |
| DE | 19628305 A1 | 1/1998 |
| DE | 29702534 U1 | 6/1998 |
| GB | 589752 | 6/1947 |

(Continued)

OTHER PUBLICATIONS

International Application Serial No. PCT/EP2010/002888, International Search Report mailed Aug. 23, 2010, 6 pgs.

*Primary Examiner* — Phuong Nguyen
(74) *Attorney, Agent, or Firm* — RatnerPrestia

(57) ABSTRACT

A heating appliance for railway vehicles has at least one heating unit, forming a load-bearing sandwich structure together with edge profiles and a core layer. According to the invention, a plurality of heating units and sandwich structures are provided, each forming modular construction units, and the construction units can be positioned and fixed relative to one another in the railway vehicle by means of connecting elements.

18 Claims, 1 Drawing Sheet

(56) References Cited

FOREIGN PATENT DOCUMENTS

Figure 1:
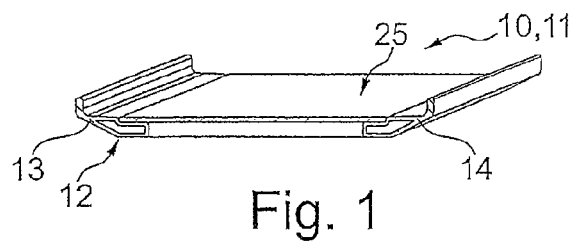

| | | |
|---|---|---|
| JP | 3287454 | 12/1991 |
| JP | 2654226 | 9/1997 |
| JP | 11278259 | 10/1999 |

* cited by examiner

HEATING APPLIANCE FOR RAILWAY VEHICLES

CROSS-REFERENCE TO RELATED APPLICATIONS

This application is a U.S. National Phase Application of PCT International Application PCT/EP2010/002888 filed 11 May 2010 and published 25 Nov. 2010 in German as WO 2010/133308 A1, which claims priority from German Application 10 2009 022 091.7, filed 20 May 2009, each of which is incorporated herein by reference in its entirety for all purposes.

BACKGROUND OF THE INVENITON

The invention relates to a heating appliance for railway vehicles according to the preamble of claim 1.

In known heating appliances of this type, the heating elements which are configured as heating foils are glued onto conventional floor panels already laid in the carriage of the railway vehicles and covered with a floor covering. This mode of construction has the drawback that individual heating elements cannot be easily exchanged in the case of damage. Instead, the disassembly of the heating elements and the electrical connections for the heating elements require a relatively high outlay in terms of time, other assembly work in the railway vehicle possibly being blocked at the same time. Furthermore, the heating foils are not tightly sealed, so that penetrating moisture can damage the heating foils. Furthermore, it is to be regarded as disadvantageous that materials adjoining the heating elements, normally wood, rubber or plastics material coverings are generally poor conductors of heat. Consequently, temperature peaks occur in the region of the heating elements and impair the heating output or lead to an unnecessarily high energy consumption in order to reach the desired temperature in the passenger compartment of the railway vehicle.

SUMMARY OF THE INVENTION

Proceeding from the described prior art, the invention is based on the object of developing a heating appliance for railway vehicles according to the preamble of claim 1 in such a way that in the case of damage or a malfunction of the heating appliance, a simple or not very time-consuming repair of the heating appliance is made possible. This object is achieved in a heating appliance for railway vehicles by the features of claim 1.

The invention is based on the idea here of configuring heating units and sandwich structures as a modular construction unit in each case, a plurality of construction units being able to be positioned and fixed relative to one another by means of connecting elements.

It is thus possible in the case of damage to a heating unit or construction unit, for the latter to be easily exchanged, as it is then only necessary to disassemble connecting elements in order to remove the respective construction unit and replace it by a possibly already stocked correctly working construction unit.

Advantageous developments of the heating appliance for railway vehicles according to the invention are disclosed in the sub-claims. All combinations of at least two features disclosed in the description, the claims and/or the figures fall within the scope of the invention.

In an advantageous development of the invention it is provided that the edge profiles are arranged on the longitudinal and transverse sides of the sandwich structure. Owing to this mode of construction, an intrinsically stable carrier element is provided, which is easy to handle.

It is particularly advantageous here if the edge profiles are configured as hollow profiles consisting of light metal, in particular of aluminium. The weight of the construction units is thus reduced, allowing easy disassembly or assembly of the construction units, on the one hand, and, on the other hand, reducing the overall weight of the heating appliance for the railway vehicle.

In order to allow a simple connection between the individual construction units, it is provided in a further advantageous configuration of the invention that the edge profiles which are arranged with the connecting element, on the side remote from the heating unit, have a receiving cross-section to the connecting element, in which the connecting element positively engages with a mirror-inverted receiving cross-section.

It is particularly advantageous here if the connecting element is configured as a flat component, has a length corresponding to the length of the associated edge profiles and terminates with its upper side at least substantially flush with the sandwich structure. This makes a level upper side of the construction units possible, which also avoids the accumulation of dirt or the like.

In order to allow simple assembly of the construction units in the railway vehicle, it is provided in a further advantageous embodiment that the connecting element has an intermediate portion which is arranged between the edge profiles, so that a free space is formed between the edge profiles, and in that the connecting element, in the region of the intermediate portion, has at least one receiver for a fastening element, with which the connecting element is detachably connected to a stationary structure.

In order to meet the requirement for a structure that is noise-insulating as far as possible, it is moreover advantageous if the edge profiles rest on the structure with the interposition of a noise decoupling layer.

Efficient and therefore economical manufacture of the edge profiles can be realised if the edge profiles of the sandwich structure are formed identically in each case pair-wise on the longitudinal and transverse sides and, on their upper side, in each case have at least one step-like indentation to positively receive a heating unit receiving the heating element.

It is particularly advantageous here if the heating unit is constructed in a layer-like manner and has an upper layer consisting of material with good heat conductivity, preferably of aluminium, and a lower cover layer, between which the heating element is arranged. This allows the heating element or the heating unit to be produced in advance and to be checked with regard to its function, it has good heat conductivity and strength and, owing to the layer-like structure, is stable such that easy or damage-free transportation of the heating unit is made possible, as the heating element is arranged in a protected manner. Furthermore, the entry of moisture into the heating unit and therefore the risk of damage to the heating unit is, at least, reduced.

It is furthermore advantageous, in the sense of economical production and a compact structure, to configure the heating element as an electrically operated heating foil with an electric connection element.

In order to avoid additional installation space being required to lay the electric connection element of the heating element, it is furthermore advantageous for the electric connection element to project through at least one through-opening of the edge profile and to be arranged in a cavity of the edge profile.

In order to increase the efficiency of the heating appliance and avoid heat being radiated at locations which do not have to be, or should not be, heated, it is furthermore advantageous for the core layer consisting of material with poor heat conductivity to be arranged below the heating unit between the edge profiles.

In order furthermore to allow a compact and stable construction of the sandwich structure, it is provided in a further advantageous configuration of the invention that an end plate is arranged on the lower side of the sandwich structure.

The heating appliance according to the invention can be used particularly advantageously as floor heating, as it allows a high degree of stability with a small installation height owing to its closed form.

Figure 2:
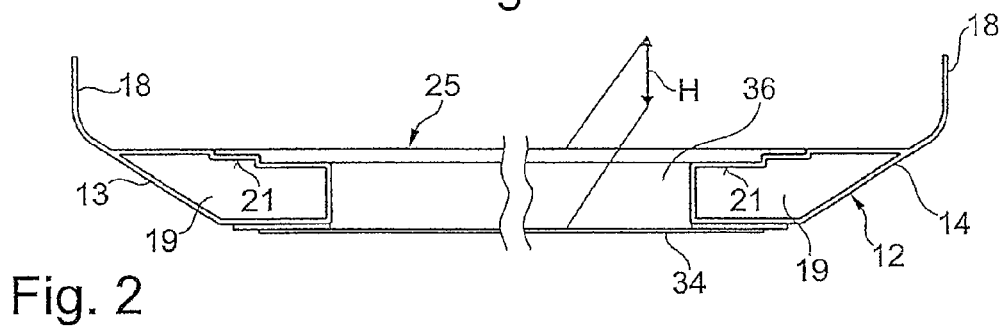
Figure 3:
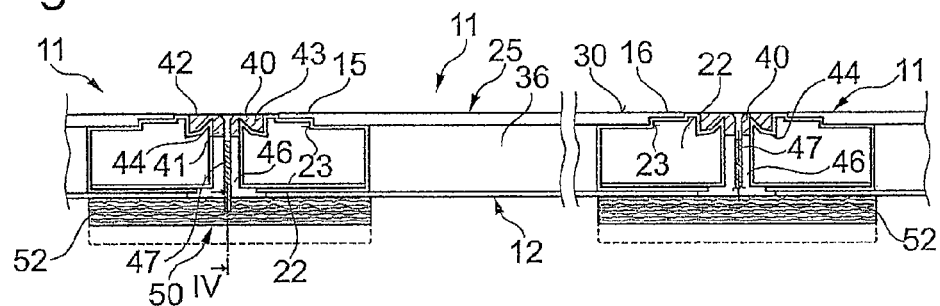
Figure 4:
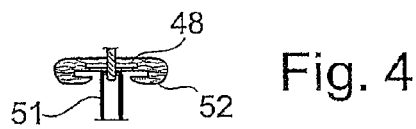
Figure 5:
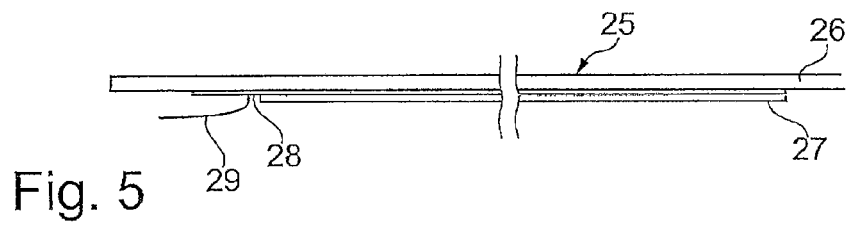
Figure 6:
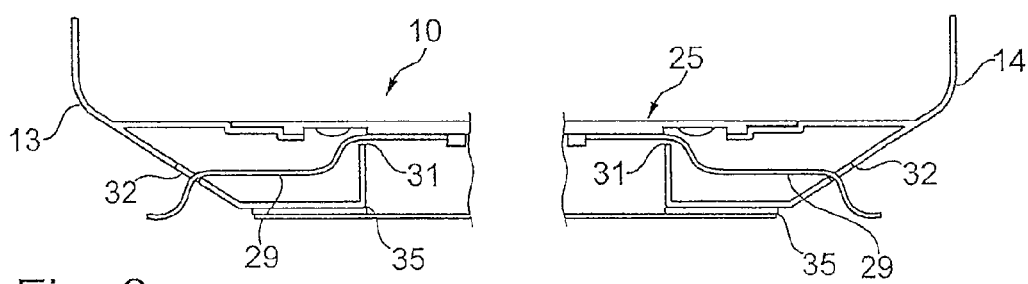

Further advantages, features and details of the invention emerge from the following description of preferred embodiments and with the aid of the drawings, in which:

FIG. 1 shows a modular construction unit for railway vehicles with a heating appliance, in a perspective view, FIG. 2 shows a cross-section through the construction unit according to FIG. 1, FIG. 3 shows a longitudinal section through a plurality of construction units connected to one another, according to FIG. 1, FIG. 4 shows a section in the plane IV-IV of FIG. 3, FIG. 5 shows a cross-section through an individual heating appliance and FIG. 6 shows a cross-section through a heating appliance analogously to FIG. 2 to illustrate the arrangement of the electric connection element of the heating appliance in the edge profile.

DETAILED DISCRIPTION OF THE INVENTION

FIG. 1 shows a heating appliance 10 for a railway vehicle. The heating appliance 10 is a component of a modular construction unit 11, which has a sandwich structure 12 being used as a carrier element. As can be seen from viewing FIGS. 1 to 3 together, the sandwich structure 12 consists of a total of four edge profiles 13 to 16, which form a rectangular base frame. The two respectively identically configured edge profiles 13, 14 are arranged here on the longitudinal sides of the sandwich structure 12, while the two also identical respective edge profiles 15, 16 are arranged on the transverse sides of the sandwich structure 12. The edge profiles 13 to 16 consist of light metal and preferably of aluminium here and are produced by the continuous casting method. Furthermore, they are configured as hollow profiles, the height H of the edge profiles 15, 16 being selected depending on the requirement or loadability of the construction unit 11, and typically being, for example, between 10 and 40 mm. As can best be seen with the aid of FIGS. 1 and 2, the edge profiles 12 form a trough-like shape, in other words, the two edge profiles 13, 14 have arched and upwardly drawn wall portions 18. The edge profiles 13 to 16 can be connected to one another by welding, or else by another suitable connecting manner, for example by means of screw connections.

Because of the hollow mode of construction of the edge profiles 13 to 16, the two edge profiles 13, 14 in each case have a cavity 19 in the longitudinal direction.

A step-like depression 21 is in each case formed on the upper side of the edge profiles 13, 14 on the side remote from the wall portions 18.

It can be seen from FIG. 3 that the edge profiles 15, 16 also have a cavity 22 in each case. Analogously to the edge profiles 13, 14, the edge profiles 15, 16, on their upper side, also have a depression 23, in each case, on one side. A heating unit 25 which is shown separately in FIG. 5 is positively received in each case in the depressions 21, 23 of the edge profiles 13 to 16.

The heating unit 25 has a sandwich-like structure and has an upper cover layer 26 consisting, in particular, of material with good heat conductivity, preferably aluminium sheet and a lower cover layer 27, which also consists of aluminium. Because of the step-like configuration of the depressions 21, 23, the upper cover layer 26 in each case has a greater length and width than the lower cover layer 27. Arranged between the upper cover layer 26 and the lower cover layer 27 is a heating foil 28, the width and length of which ranges between the length and width of the upper cover layer 26 and the lower cover layer 27.

The heating foil 28 which is known per se works electrically and, for this purpose, has an electric connection element 29. If the heating unit 25 is arranged in the depressions 21, 23 of the sandwich structure 12, the surface of the sandwich structure 12 forms a level upper side 30, as shown, in particular, in FIGS. 2 and 3.

The connection between the heating unit 25 and the sandwich structure 12 takes place, for example, by gluing in the depressions 21, 23 or else by screws (not shown) in the edge region of the upper cover layer 26, which, for this purpose, has corresponding indentations for the screw heads in order to allow an upper side 30 of the construction unit 11 that is as level as possible.

To guide the electric connection elements 29, the sandwich structure 12 has, on its edge profiles 13 or 14, through-bores 31, 32 shown in FIG. 6, which means that the electric connection elements 29 are arranged in the cavity 19 of the edge profiles 13, 14.

While the closed upper side 30 of the sandwich structure 12 is formed by the heating units 25, a lower end plate 34, preferably also consisting of aluminium, is provided as the cover layer on the lower side of the sandwich structure 12. The intermediate space between the lower cover layer 27 of the heating unit 25 and the end plate 34 of the sandwich structure 12 is filled by a core layer 36, consisting of a material with poor heat conductivity, for example of structural foam, which is preferably arranged, in each case, in bearing contact with the edge profiles 13 to 16. To avoid heat bridges between the edge profiles 13 to 16 and the end plate 34, strip-like intermediate layers 35, consisting, for example, of plastics material, are additionally arranged between the cover layer 34 and the edge profiles 13 to 16.

Before the actual assembly of the construction unit 11 shown in FIG. 6, the heating unit 25 shown in FIG. 5 can be manufactured separately and checked with regard to its functions. The heating unit 25 is then placed on the edge profiles 13 to 16 and the core layer 36 and glued thereto over a large area. The electric connection elements 29 are guided here through the through-bores 31, 32 in the edge profiles 13, 14.

The construction unit 11 which is described to this extent, in particular, has a transverse extent adapted to the internal width of the railway vehicle and additionally, because of its modular-like construction, for example a base length in the longitudinal direction of, for example, 80 cm. A construction unit 11 of this type can still be handled well, i.e., it has a weight that can easily be handled, for example, by one or two fitters and provides the possibility of easily being able to remove the construction unit 11 again from the railway vehicle through existing openings, for example doors, if said construction unit is already installed in the railway vehicle.

According to the invention it is provided that a plurality of construction units 11 according to the invention (which, because of their modular mode of construction, may have different or the same lengths) can be connected to one another. A connection of this type is shown by way of example in FIG. 3. The connection between the individual construction units 11 is made possible on the transverse sides of the construction units 11 by means of clamping profiles 40.

The clamping profiles 40, in particular also consisting of aluminium and produced by the continuous casting method, are substantially flat and have a rectangular central region 41 and two approximately triangular edge regions 42, 43. One edge region 42, 43 in each case cooperates positively with an edge region 44 which is correspondingly configured in a mirror-inverted manner and is formed in the edge profile 15, 16 in its longitudinal direction. The configuration of the clamping profile 40 or the edge regions 42 to 44 is such that, when the clamping profile 40 is assembled, the upper side of construction units 11 which are connected to one another are as level as possible.

As is seen from FIG. 3, a free space 46 is formed between two respective adjacent construction units 11 because of the central region 41 of the clamping profile 40. This free space 46 can be used to fasten the clamping profiles 40 and therefore the construction units 11 in the railway vehicle. For this purpose, the clamping profile 40 has, for example, through-bores, which are arranged in the central region 41. The clamping profiles 40 can therefore be anchored on a fastening plate 48 by means of fastening screws 47.

The fastening plate 48 is a component of a stationary support construction 50, which is arranged in the railway vehicle and is used for the support of the construction units 11. The support construction 50 extending in the longitudinal direction of the railway vehicle or the sandwich structure 12 has longitudinal carriers 51 with a substantially U-shaped profile in cross-section with level, angled edge strips 52. In the upper region of the longitudinal carrier 51, the latter is provided with a rubber layer, which comprises the edge strips 52 and in which the fastening plate 48 is also arranged. The rubber layer is used for acoustic decoupling of the construction units 11 from the support construction 50 or from the railway vehicle.

It is additionally mentioned that the heating unit 25 can also be operated by means of hot water instead of an electrically operated heating foil 28. The hot water may, for example, in a similar way to in residential buildings, be guided in hoses between the upper cover layer 26 and the lower cover layer 27.

The invention claimed is:

1. A railway vehicle floor assembly for a railway vehicle comprising:
    a railway vehicle floor base frame including hollow edge profiles, wherein floor surfaces of the hollow edge profiles form a portion of a floor surface of the railway vehicle floor assembly, and the hollow edge profiles located at longitudinal sides of the railway vehicle floor assembly each includes an arched and upwardly drawn wall portion extending to an elevation above the floor surfaces;
    a core layer positioned between the hollow edge profiles;
    a lower end plate positioned beneath at least one of the hollow edge profiles; and
    at least one heating unit positioned above the core layer and between the hollow edge profiles for heating the railway vehicle floor assembly, with the at least one heating unit forming a load-bearing sandwich structure together with the hollow edge profiles, the core layer and the lower end plate,
    wherein the heating unit, the edge profiles, the core layer and the lower end plate together form a modular construction unit,
    wherein the edge profiles together form the base frame which receives the heating unit on an upper side of the base frame such that a top surface of the heating unit is flush with floor surfaces of the edge profiles to form the floor surface of the railway vehicle floor assembly, and the base frame receives the lower end plate on a lower side of the base frame that opposes the heating unit,
    wherein the heating unit has an upper and lower cover layer and a heating element sandwiched between the upper and lower cover layers, and wherein the core layer, which has a lower heat conductivity than the base frame, is arranged between the lower cover layer of the heating unit and the lower end plate, and
    wherein the construction units are configured to be positioned and fixed relative to one another in the railway vehicle by connecting elements.

2. The railway vehicle floor assembly according to claim 1, wherein the edge profiles are arranged on longitudinal and transverse sides of the sandwich structure.

3. The railway vehicle floor assembly according to claim 2, wherein the edge profiles comprise light weight metal.

4. The railway vehicle floor assembly according to claim 3, wherein the lightweight metal is aluminum.

5. The railway vehicle floor assembly according to claim 3, wherein the edge profiles are produced by continuous casting.

6. The railway vehicle floor assembly according to claim 2, wherein the edge profiles which are connected to the connecting element, on a side remote from the heating unit, have a receiving cross-section for the connecting element, in which the connecting element positively engages.

7. The railway vehicle floor assembly according to claim 6, wherein the connecting element is configured as a flat component, has a length corresponding to the length of the associated edge profiles and terminates with its upper side at least substantially flush with the sandwich structure.

8. The railway vehicle floor assembly according to claim 6, wherein the connecting element has an intermediate portion, which is arranged between the edge profiles, so that a free space is formed between the edge profiles, and wherein the connecting element, in the region of the intermediate portion, has at least one receiver for a fastening element, with which the connecting element is detachably connected to a stationary structure.

9. The railway vehicle floor assembly according to claim 8, wherein the edge profiles rest on the stationary structure with the interposition of a noise decoupling layer.

10. The railway vehicle floor assembly according to claim 6, wherein the edge profiles comprise continuously casted aluminum profiles.

11. The railway vehicle floor assembly according to claim 1, wherein the edge profiles of the sandwich structure are in each case identically configured pair-wise on the longitudinal and transverse sides and, on their upper side, in each case have at least one stepped indentation to positively receive the heating unit.

12. The railway vehicle floor assembly according to claim 11, wherein the heating unit is constructed in a layered manner.

13. The railway vehicle floor assembly according to claim 12, wherein the heat conductive material is aluminum.

14. The railway vehicle floor assembly according to claim 1, wherein the heating element is configured as an electrically operated heating foil with an electric connection element.

15. The railway vehicle floor assembly according to claim 14, wherein the electric connection element projects through at least one through-opening of the edge profile and is arranged in a cavity of the edge profile.

16. The railway vehicle floor assembly according to claim 1, wherein the heating appliance is configured as floor heating.

17. The railway vehicle floor assembly according to claim 1, wherein the core layer comprises structural foam material.

18. The railway vehicle floor assembly according to claim 1, wherein the upper cover layer of the heating unit comprises an aluminum sheet.

* * * * *